United States Patent [19]

Kintaichi et al.

[11] Patent Number: 5,227,145
[45] Date of Patent: Jul. 13, 1993

[54] PROCESS FOR REMOVING NITROGEN OXIDES FROM EXHAUST GASES

[75] Inventors: Yoshiaki Kintaichi; Hideaki Hamada; Takehiko Ito; Motoi Sasaki, all of Ibaraki; Fujio Suganuma, Saitama; Mitsunori Tabata, Saitama; Akihiro Kitazume, Saitama; Kazushi Usui, Chiba; Tadao Nakatsuji; Hiromitsu Shimizu, both of Osaka, all of Japan

[73] Assignees: Agency of Industrial Science and Technology; Petroleum Energy Center; Cosmo Oil Co., Ltd., all of Tokyo; Sakai Chemical Industry Co., Ltd., Osaka, all of Japan

[21] Appl. No.: 815,040

[22] Filed: Dec. 31, 1991

[30] Foreign Application Priority Data

Jan. 8, 1991 [JP] Japan .................................. 3-41360
Jan. 8, 1991 [JP] Japan .................................. 3-41361
Feb. 2, 1991 [JP] Japan .................................. 3-33523

[51] Int. Cl.$^5$ .......................... B01J 8/00; C01B 21/00; B01D 47/00
[52] U.S. Cl. ..................................... 423/239; 423/212
[58] Field of Search ................... 423/239, 239 A, 212

[56] References Cited

U.S. PATENT DOCUMENTS 3,382,033  5/1968  Kitagawa .......................... 423/239
4,119,568 10/1978  Nishida et al. .................... 423/239
4,950,139  8/1990  Fennemann et al. ............... 423/239

FOREIGN PATENT DOCUMENTS 0218070  4/1987  European Pat. Off. .
2166190  8/1973  France .

OTHER PUBLICATIONS

Derwent Abstract of JP2211224, 1989.
Derwent Abstract of JP58156349, 1982.

Primary Examiner—Gregory A. Heller
Attorney, Agent, or Firm—Sughrue, Mion, Zinn, Macpeak & Seas

[57] ABSTRACT

A process for removing nitrogen oxides from an exhaust gas by bringing the exhaust gas containing nitrogen oxides into contact with at least one catalyst selected from a polyvalent metal phosphate, a polyvalent metal sulfate or an aluminate of a transition metal of the 4th period of the Periodic Table in an oxidizing atmosphere containing excess oxygen and in the presence of a hydrocarbon or an oxygen containing organic compound. There is also disclosed a process for removing nitrogen oxides from an exhaust gas which comprises bringing the exhaust gas into contact with the above catalyst and then with an oxidation catalyst.

17 Claims, No Drawings

PROCESS FOR REMOVING NITROGEN OXIDES FROM EXHAUST GASES

FIELD OF THE INVENTION

The present invention relates to a process for removing nitrogen oxides from exhaust gases. More particularly, the present invention relates to a process for removing nitrogen oxides from exhaust gases which comprises bringing a specific catalyst into contact with an exhaust gas containing nitrogen oxides in an oxidizing atmosphere with excess oxygen and in the presence of a small amount of a hydrocarbon or an oxygen-containing compound which either may be added to or may be initially present in the exhaust gas as a residue.

BACKGROUND OF THE INVENTION

Nitrogen oxides (referred to hereinafter as $NO_x$) which are contained in various types of exhaust gases not only threaten the health of individuals but are in general environmentally undesirable since they may cause acid rain or photochemical smog. Accordingly, the development of an effective means for exhaust gas treatment, specifically the development of an effective $NO_x$ abatement method, has been sought by those in the art.

Some processes for reducing the $NO_x$ content of exhaust gases using catalysts have been put into practice.

As examples of such processes, there can be mentioned a ternary catalyst process for gas fueled automobiles and a selective catalytic reduction process using ammonia for exhaust gases which are discharged from heavy industrial installations comprising, for example, boilers.

As another example of such a process, there can be mentioned a process for removing $NO_x$ from exhaust gases using hydrocarbons, which comprises bringing a gas containing $NO_x$ into contact with a metal oxide catalyst, for example, a catalyst composed of a metal such as copper supported on alumina in the presence of a hydrocarbon (see, JP-A-63-100919 (the term "JP-A" as used herein means an "unexamined published Japanese patent application")).

In the first process proposed above, i.e., in the ternary catalyst process, the hydrocarbon components and carbon monoxide initially present in the waste gas which is exhausted upon combustion of the fuel are converted to water and carbon dioxide with the aid of a catalyst while consuming the oxygen in the $NO_x$ to thereby reduce it to nitrogen. In this process, however, the combustion must be carefully controlled in that a stoichiometric amount of oxygen is supplied to the combustion system so that the oxygen content in the $NO_x$ compensates for the amount of oxygen consumed in the oxidation of the hydrocarbon components and carbon monoxide. Thus, this process is, in principle, not applicable to a combustion system where excess oxygen is present, such as a system involving a diesel engine.

The second process, i.e., the selective catalytic reduction process using ammonia, is hard to handle and requires a very large scale installation for the sake of safety, since the process uses ammonia which is very toxic and must generally be handled under high pressure. Accordingly, there is difficulty in applying this process to systems comprising a small scale exhaust gas source, particularly movable exhaust gas sources, from the technological viewpoint. Further, the process is disadvantageous from the economical viewpoint.

The last process mentioned above, i.e., the process for removing $NO_x$ from exhaust gases using a metal oxide catalyst, is intended for application mainly to gas-fueled automobiles. Accordingly, the process is unsuitable for treating exhaust produced by combustion in a diesel engine. If the process were to be applied to an exhaust gas from a diesel engine, the activity of the catalyst would be insufficient to achieve the desired level of $NO_x$ removal. In more detail, the catalyst composed of a metal such as copper supported on alumina not only suffers degradation due to sulfur oxides, discharged from the diesel engine, but also loses activity due to aggregation or like behavior of the metal component thereof. Thus, this process has not been put into practice for the removal of $NO_x$ from exhaust gases discharged from diesel engines.

The present inventors previously proposed processes using a catalyst obtained by treating a metal oxide with a compound having a sulfate group to solve the problems mentioned above. The present inventors have further made studies and found that when catalysts comprising a polyvalent metal phosphate, a polyvalent metal sulfate or a metal aluminate are used, the $NO_x$ components can be effectively removed from exhaust gases even in the presence of sulfur oxides without a loss of activity. The present invention was completed on the basis of this finding.

SUMMARY OF THE INVENTION

The present invention was completed based on studies carried out with a view to overcome the problems of the three processes described in the foregoing.

Thus, an object of the present invention is to provide a process for removing nitrogen oxides from exhaust gases which can efficiently remove $NO_x$ in an oxidizing atmosphere from exhaust gases discharged from various plants and equipment including diesel engines and the like.

Accordingly, the present invention provides a process for removing nitrogen oxides from exhaust gases which comprises bringing an exhaust gas containing nitrogen oxides into contact with a catalyst comprising a tetravalent or polyvalent metal phosphate, a bivalent or polyvalent metal sulfate or an aluminate of a metal selected from transition metals of the 4th period of the Periodic Table in an oxidizing atmosphere containing excess oxygen and in the presence of a hydrocarbon or an oxygen-containing organic compound.

Further, the present invention provides a process for removing nitrogen oxides from exhaust gases which comprises bringing an exhaust gas containing nitrogen oxides into contact with the afore-mentioned catalyst under the above described conditions and then with an oxidation catalyst.

DETAILED DESCRIPTION OF THE INVENTION

The process of the present invention is now illustrated in more detail.

Among the phosphates used as the catalysts in the process of the present invention, the term "polyvalent metal phosphate" as used herein refers to a tetravalent or polyvalent metal phosphate. Tetravalent or pentavalent metal phosphates are preferred. Examples of such phosphates include the phosphates of Groups III, IV and V metals of the Periodic Table. Specific examples of the phosphates include tin phosphate, zirconium phosphate, titanium phosphate, vanadium phosphate, niobium phosphate and cerium phosphate.

These phosphates can be obtained in the forms of both a non-crystalline compound and a crystalline compound depending on the method of the preparation thereof, and both the non-crystalline compound and the crystalline compound can be used in the present invention without particular limitation with regard to the structure thereof. However, phosphates having a high surface area are generally preferred.

There is also no particular limitation with regard to the composition thereof, i.e., the ratio of phosphoric acid group(s) to metal.

Examples of the non-crystalline phosphates include various metal phosphates such as zirconium phosphate and titanium phosphate. Examples of the crystalline phosphates include the phosphates of zirconium and titanium such as $\gamma$-zirconium phosphate and $\beta$-titanium phosphate.

These phosphates can be prepared by conventional processes. The non-crystalline phosphates can be prepared, for example, by a precipitation process wherein a phosphoric acid source such as phosphoric acid, ammonium phosphate or sodium phosphate is reacted with a desired source of the metal which yields the metal phosphate such as a metal nitrate, a metal sulfate, a metal chloride, a metal hydroxide or a metal oxide in an aqueous solution to form a precipitate; a kneading process wherein a phosphoric acid source is kneaded with a metal hydroxide; or a solid phase reaction process wherein a phosphoric acid source is mixed with a metal salt and the mixture is dried and then calcined.

The crystalline phosphates such as crystalline titanium, zirconium and niobium phosphates can be prepared from the above-described phosphoric acid sources and metal sources by a hydrothermal process, a solid phase synthesis process and a gel-form phosphoric acid recycling process.

Many phosphates have ion exchange capacity, e.g., zirconium phosphate. There can be used metal ion-substituted compounds formed by replacing a part of the metal phosphate with another metal ion such as an alkali metal, an alkaline earth metal, a transition metal or a platinum group metal. Two or more replacing ion species may be used. The ion exchange can be carried out by conventional processes.

For example, a metal phosphate is immersed in an aqueous solution of a metal salt containing a desired metal ion at room temperature or at a temperature of about 50° to 100° C. for several hours or overnight to thereby effect an exchange of metal ions therebetween. The product is washed with water, dried and calcined to obtain the desired other metal ion-substituted product.

The phosphate obtained by immersing the phosphate with the metal species or depositing the metal species on the phosphate is effective as the catalyst in the present invention.

As the metal species to be contained on the catalyst by means of an ion exchange or deposition, a transition metal of the 4th period of the Periodic Table, for example, copper and platinum metals, are particularly effective. In the case of reduction with particulates, it is particularly effective that two or more of alkali metals and/or alkaline earth metals are contained in the catalyst.

The phosphate may be supported on a carrier in the present invention.

The carrier includes inorganic carriers such as metal oxides and natural substances, both of which are conventional in the art. Examples of the metal oxides include magnesia, silica, alumina, titania, zirconia, chromia, silica-alumina and silica-magnesia. Typical examples of the natural substances include silicates, clays such as kaolin and diatomaceous earth. Preferred carriers include alumina, silica, chromia and silica-alumina. These carrier materials may be used either alone or in combination of two or more thereof.

The carriers have effects of well-dispersing the phosphates without detriment to catalytic characteristics, improving catalytic activity and selectivity in co-operation with the catalytic component, promoting the removal of heat of reaction and improving the moldability of the catalyst.

The blending of the carrier can be conducted by conventional methods without particular limitation with regard to the order of the blending of the carrier with catalytic components and the blending method.

The carrier is used in an amount of not more than about 95 wt %, preferably about 10 to 80 wt % based on the combined amount of the carrier and the catalytic component.

The catalyst can be used in any form of a powder, granule, pellet, honeycomb and the like without particular limitation with regard to the shape and structure thereof. When the catalyst is molded, conventional binders such as clay (e.g., bentonite), silica and polyvinyl alcohol or lubricants such as graphite, wax, salts of fatty acids and polyethylene glycol can be used.

It is preferred that the phosphates are calcined and then used. The calcining temperature is generally about 200° to 800° C., preferably about 300° to 600° C. The calcining treatment may be carried out after the preparation of the phosphates or at any stage during the course of the preparation thereof.

Examples of the polyvalent metal sulfate (hereinafter referred to as metal sulfate; metal sulfate means polyvalent metal sulfate, unless otherwise stated) which is used as a catalyst in the present invention include the sulfates of metals of Group I subgroup a, Group II, Group III, Group IV, Group V subgroup a, Group VI subgroup a, Group VII subgroup a and Group VIII of the Periodic Table. Examples of the metal sulfate include copper sulfate, magnesium sulfate, zinc sulfate, cadmium sulfate, barium sulfate, aluminum sulfate, zirconium sulfate, vanadium sulfate, chromium sulfate, manganese sulfate, iron sulfate, cobalt sulfate and nickel sulfate.

These metal sulfates may be used without a carrier, or may be supported on a carrier. Further, these metal sulfates may be used either alone or in a combination of two or more thereof.

Examples of the carrier include inorganic carriers as are conventionally used in the art. Generally, those having a high surface area are preferred, though there is no particular limitation thereon.

The metal sulfates can be supported on the carrier by conventional methods without particular limitation. For example, a powdered or pelletized carrier can be impregnated with an aqueous solution of a desired metal sulfate. Excess water is removed by filtration or evaporation, and the impregnated product is dried and calcined to obtain a catalyst supported on a carrier. In another embodiment, an aqueous solution of a desired metal sulfate is added to a hydrosol or slurry of a carrier material, and the mixture is kneaded, dried and calcined to obtain a catalyst supported on a carrier.

When a water-insoluble metal sulfate such as barium sulfate is used, a carrier material is mixed with an aqueous solution of a water soluble metal salt, and a solution containing sulfate ion such as sulfuric acid or ammonium sulfate is added thereto to thereby deposit a metal sulfate on the carrier material, whereby the metal sulfate can be supported on the carrier.

When the catalyst is to be supported on a carrier, the amount of the metal sulfate supported on the carrier varies depending on the type of the metal sulfate or the carrier. When the amount of the metal sulfate is too large, the effect of the carrier is not displayed, while when the amount is too small, the metal sulfate does not display its performance as a catalyst. Generally, the amount of the metal sulfate is about at least 0.1 wt %, up to 80 wt %, preferably about 1 to 60 wt % based on the combined amount of the metal sulfate and the carrier.

The metal sulfate catalyst can be used in any form as in the case of the metal phosphate described above. The calcining temperature given for the phosphates can be used.

The metal aluminate which can be used as a catalyst in the present invention will be illustrated below.

The term "metal aluminate" as used herein refers to a composite oxide of a metal and aluminum. Most metal aluminates have a spinel structure. The metal aluminate can be represented by the general formula $MAl_2O_4$, where M is a transition metal of the 4th period of the Periodic Table. In addition to the spinel structure, a metal aluminate, i.e., a metal-aluminum composite oxide having a perovskite structure or a delafossite structure, is also effective as a catalyst.

Examples of the transition metal of the 4th period of the Periodic Table include chromium, manganese, iron, cobalt, nickel, copper and zinc. The aluminates of these transition metals can be synthesized by any conventional co-precipitation method, alkoxide method, impregnation method and kneading method.

In the co-precipitation method, a solution of an appropriate basic precipitant is dropwise added to a mixed solution of a transition metal nitrate, sulfate or chloride and aluminum nitrate, sulfate or chloride (a molar ratio of about 1:2 of transition metal aluminum). The resulting precipitate is washed, dried and calcined in air to obtain a metal aluminate. Examples of the precipitant include sodium hydroxide, potassium hydroxide, ammonium hydroxide, sodium carbonate, potassium carbonate and ammonium carbonate.

In the alkoxide method, water is added to an alcohol solution of a mixture of a transition metal alkoxide and aluminum alkoxide. The gel-like precipitate resulting from hydrolysis is dried and calcined in air to thereby obtain a metal aluminate.

The aluminates of the transition metals of the 4th period of the Periodic Table may be supported on a conventional inorganic carrier such as alumina, silica-alumina, titania or zirconia. The catalyst composed of the metal alumina supported on the inorganic carrier can be prepared by any of a conventional impregnation method, precipitation method and kneading method.

For example, a metal aluminate catalyst supported on alumina can be obtained using alumina. In the impregnation method, the activated alumina is impregnated with a solution of a transition metal compound, and the impregnated product is dried and calcined in air to obtain the metal aluminate supported on alumina. Examples of the transition metal compound include transition metal nitrates and transition metal salts of various organic acids, for example, acetic acid and oxalic acid.

In the precipitation method, a solution of a suitable basic precipitant, for example, sodium hydroxide and ammonia solution is dropwise added to a mixed solution of the transition metal and aluminum (a molar ratio of transition metal/aluminum of not higher than $\frac{1}{2}$). The resulting precipitate is washed, dried and calcined in air to obtain the metal aluminate supported on alumina.

When the metal aluminate is to be supported on an inorganic carrier such as alumina or silica-alumina, the amount of the metal in the metal aluminate supported on the carrier is generally about 0.1 to 40 wt %, preferably about 0.5 to 30 wt %, based on the total amount or weight of the catalyst. When the amount of the metal is less than about 0.1 wt %, an effect of improving the activation of the reduction of $NO_x$ cannot be obtained, while when the amount is more than about 40 wt %, there is the possibility that a part of the transition metal will not be incorporated into the aluminate structure, an oxide of a transition metal alone is formed and the oxide does not contribute to the selective reduction of $NO_x$.

The optimum calcination temperature in air varies depending on the types of the transition metal(s), but is generally about 400° to 1000° C., preferably about 500° to 900° C. When the calcination temperature in air is too low, a phase of the transition metal alone is formed and the metal aluminate is not formed, while when the temperature is too high, the surface area of the resulting catalyst is reduced and the catalyst activity is lowered.

The catalyst can be used in any form of a powder, granule, pellet, honeycomb structure or the like. If desired, binders may be used as mentioned above.

The process according to the present invention is intended for $NO_x$ abatement of exhaust gases discharged from diesel engines of diesel engine automobiles, stationary diesel engines and the like as well as for the treatment of the exhaust gases discharged from gasoline fueled engines such as gasoline fueled automobiles. It is also intended to be used for the treatment of exhaust gases discharged from plants manufacturing nitric acid, various types of combustion installations, and the like.

The $NO_x$ components are removed from the exhaust gases described above by bringing the catalysts set forth above into contact with the exhaust gas in an oxidizing atmosphere and in the presence of hydrocarbons or oxygen-containing organic compounds.

The term "oxidizing atmosphere" as used herein refers to an atmosphere containing an excess amount of oxygen with respect to the amount required for effecting the complete oxidation of the components (i.e., carbon monoxide, hydrogen and hydrocarbons) contained in the exhaust gas and of the optionally used reducing substances such as the hydrocarbons or the oxygen-containing organic compounds to yield water and carbon dioxide. There can be mentioned, in the case of a combustion engine such as in an automobile, for example, an atmosphere having an excess air ratio (lean region), which commonly has an excess oxygen percentage of from about 20 to about 200%. In an oxidizing atmosphere as defined above, the $NO_x$ is predominantly reduced, since the catalyst selectively promotes the reaction of the hydrocarbons or the oxygen-containing organic compounds with $NO_x$ over that of the hydrocarbons or the oxygen-containing organic compounds with oxygen.

It is preferred that the reaction is carried out in an oxidizing atmosphere because the catalysts of the present invention function well in an oxidizing atmosphere, while their activity for reducing and decomposing $NO_x$ is lowered in a reducing atmosphere.

The hydrocarbons or the oxygen-containing organic compounds present, i.e., the reducing substances for reducing, decomposing and removing $NO_x$, may be residual hydrocarbons or oxygen-containing organic compounds which have remained in the exhaust gas or particulate materials which are the incomplete combustion products of fuel and the like, but if the residual hydrocarbons or the oxygen-containing organic compounds present are too low with respect to the amount required for promoting the reaction between the hydrocarbons or the oxygen-containing organic compounds and the $NO_x$, a compensatory amount of a hydrocarbon or an oxygen-containing organic compound should be additionally supplied from an external source.

There is no particular limitation with respect to the amount of the hydrocarbons or the oxygen-containing organic compounds to be present. For example, when the amount of $NO_x$ to be removed is allowed to be low, the amount of the hydrocarbons or the oxygen-containing organic compounds may sometimes be less than the stoichiometric amount required for the reduction decomposition of the $NO_x$, but it is preferred that there be present excess hydrocarbons or oxygen-containing organic compounds in the reaction system, since the reduction reaction more favorably proceeds in the presence of excess hydrocarbons or oxygen-containing organic compounds with respect to the amount strictly or stoichiometrically necessary for the reduction of $NO_x$. In general, the hydrocarbons or the oxygen-containing organic compounds are used in an amount of about 20 to 2,000% excess, preferably about 30 to 1,500% excess, with respect to the theoretical or stoichiometric amount of the hydrocarbons or the oxygen-containing organic compounds for the reduction decomposition of the $NO_x$.

The theoretical amount of the hydrocarbon or the oxygen-containing organic compound necessary for the reduction decomposition of the $NO_x$ is defined herein as the amount of the hydrocarbon or the oxygen-containing organic compound necessary for reducing nitrogen dioxide ($NO_2$) into nitrogen. Since oxygen is present in the reaction system, it is assumed that oxygen finally oxidizes all $NO_x$ into nitrogen dioxide. To this end, for example, in the case of reducing 1,000 ppm of nitrogen monoxide (NO) in the presence of oxygen using propane as the hydrocarbon, the theoretical amount of propane necessary in the reaction system is 200 ppm. In general, the hydrocarbon or the oxygen-containing organic compound necessary in the reaction system is in the range of from about 50 to 10,000 ppm in terms of methane, though it depends on the amount of the $NO_x$ present in the exhaust gas.

As the reducing substances for use in the reduction of $NO_x$ in the presence of the aforesaid catalysts in the process of the present invention, there can be effectively used any reducing substances, so long as they are carbon-containing materials such as combustible organic compounds. However, nitrogen, sulfur and halogen compounds are practically disadvantageous in cost and pose problems in that secondary harmful materials are formed and they damage the catalyst(s). Solid materials such as carbon black and coal are generally not preferred from the viewpoints of the feed thereof to catalyst beds and the contact thereof with the catalysts. In general, hydrocarbons or oxygen-containing organic compounds are preferred. Gaseous or liquid materials are preferred from the viewpoint of the feed thereof to the catalyst beds, and materials which are vaporized at a reaction temperature are particularly preferred from the viewpoint of the reaction.

Examples of the gaseous hydrocarbons which can be used in the process of the present invention include hydrocarbon gases such as methane, ethane, ethylene, propane, propylene, butane, and butylene. Examples of the liquid hydrocarbons include simple hydrocarbons such as pentane, hexane, octane, heptane, octene, benzene, toluene and xylene and petroleum based hydrocarbon oils such as gasoline, kerosene, gas oil and heavy oil. Examples of the oxygen-containing organic compounds which can be used in the process of the present invention include alcohols such as methyl alcohol, ethyl alcohol, propyl alcohol and octyl alcohol; ethers such as dimethyl ether, ethyl ether and propyl ethyl; esters such as methyl acetate, ethyl acetate and oils and fats; and ketones such as acetone and methyl ethyl ketone. These hydrocarbons or oxygen-containing organic compounds may be used either alone or in a combination of two or more thereof.

Non-combusted or incomplete combustion products of fuel, etc., that is, hydrocarbons or particulates present in the exhaust gas, are also effective as reducing agents. These products are also included within the scope of the hydrocarbons in the process of the present invention. Thus, it will be understood that the catalysts of the present invention have a function of decreasing or removing hydrocarbons or particulates in the exhaust gas.

The reaction is carried out by passing the $NO_x$-containing gas through a reaction vessel packed with the aforesaid catalyst in an oxidizing atmosphere and in the presence of the hydrocarbon or the oxygen-containing organic compound. The optimum reaction temperature varies depending on the types of the catalysts and the hydrocarbons or the oxygen-containing organic compounds, but is preferably a temperature which is as close as possible to that of the exhaust gas temperature, since there is no need to install any heating means for adjusting the temperature. In general, a reaction temperature is about 100° to 800° C., preferably about 200° to 600° C. The reaction proceeds under high pressure or reduced pressure, but it is preferred that the reaction is allowed to proceed by introducing the exhaust gas into the catalyst bed under normal exhaust pressure, though there is no particular limitation with respect to reaction pressure. The hourly space velocity at which the exhaust gas is introduced into the catalyst bed varies depending on the types of the catalysts, reaction conditions, required removal ratio of the $NO_x$, etc. Though there is no particular limitation with regard to the hourly space velocity, it is generally in the range of from about 500 to 100,000 $hr^{-1}$, preferably about 1,000 to 70,000 $hr^{-1}$. In the case of applying the process of the present invention to the treatment of exhaust gas discharged from an internal combustion engine, the catalysts of the present invention are preferably arranged on the downstream side of the exhaust manifold of the engine.

When the exhaust gas is treated by the process of the present invention, there may be the case, depending on the treating conditions, in which noncombusted hydrocarbons or incomplete combustion products such as carbon monoxide, which causes environmental pollution, are discharged from the reaction vessel. In such a case, the exhaust gas passed through the bed of the aforesaid catalyst (hereinafter referred to as the reduction catalyst) is then brought into contact with an oxidation catalyst.

As the oxidation catalyst in the process of the present invention, there can be used any of oxidation catalysts which allows the above incomplete combustion products to be completely burnt. Examples of such oxidation catalysts include catalysts composed of one or more catalytic ingredients (e.g., noble metals such as platinum, palladium, rhodium, ruthenium and iridium; base metal oxides such as lanthanum, cerium, copper, iron and molybdenum; and perovskite crystal structures such as cobalt lanthanum trioxide, iron lanthanum trioxide and cobalt strontium trioxide) supported on a porous carrier such as activated alumina, silica or zirconia. The amount of the catalytic component supported on the carrier is about 0.01 to 2 wt % in the case of the noble metal and about 5 to 70 wt % in the case of the base metal oxide, each amount being based on the amount or weight of the carrier. These catalytic ingredients, particularly base metal oxides, can be used without a carrier.

The oxidation catalyst can be used in any form of a powder, granule, pellet, honeycomb structure and the like as with the reduction catalyst. The same additives as those for the reduction catalyst can be used to mold the oxidation catalyst.

The proportion of the reduction catalyst to the oxidation catalyst and the amount of the catalytic component supported on the oxidation catalyst can be properly selected according to the performance required for the catalyst system. Particularly, when the material to be removed by oxidation is an intermediate such as carbon monoxide produced during the oxidation of the hydrocarbon, there may be used a mixture of a reduction catalyst and an oxidation catalyst. In general, however, the catalysts are used in such an arrangement that the reduction catalyst is set on the upstream side of the exhaust gas and the oxidation catalyst is set on the downstream side of the exhaust gas, that is, the reduction catalyst is first contacted with the exhaust gas and then the oxidation catalyst is contacted with the exhaust gas.

In the practical use of such catalysts in the process of the present invention, for example, a reactor charged with a reduction catalyst is set at the exhaust gas inlet side (primary stage) with another reactor charged with an oxidation catalyst set at the exhaust gas discharge side (secondary stage). It is also possible to use a single reactor charged with both a reduction catalyst and an oxidation catalyst at a proportion determined according to the required performance.

The reduction catalyst (A) and the oxidation catalyst (B) are used, in terms of their (A)/(B) weight ratio, in the range of from about 5/95 to about 95/5.

The working temperature of the oxidation catalyst used may be different from that of the reduction catalyst used. However, it is preferred that there are chosen oxidation catalysts which can be used at a working temperature within the range of the working temperature of the reduction catalysts, since then there is no need to use any heating and cooling means.

According to the process of the present invention, $NO_x$ can be efficiently removed from exhaust gas in an oxidizing atmosphere containing excess oxygen as illustrated above. This is because the polyvalent metal phosphate catalysts, the polyvalent metal sulfate catalysts or the transition metal aluminate catalysts of the present invention preferentially accelerate the reaction of the $NO_x$ with the hydrocarbons or the oxygen-containing organic compounds in the presence of the hydrocarbons or the oxygen-containing organic compounds.

Further, the use of the oxidation catalyst enables the complete oxidation of any non-reacted hydrocarbon or hydrocarbons produced as well as intermediate oxidation products (including carbon monoxide) being discharged depending on the reaction conditions and causing environmental pollution into carbon dioxide and water vapor.

The process according to the present invention is, therefore, of high practical value in industry, since it not only effectively removes $NO_x$ components from exhaust gases discharged from various sources including diesel engines or the like, but also effectively avoids discharge of toxic components to the atmosphere.

The present invention is now illustrated in greater detail by reference to the following Examples which, however, are not to be construed as limiting the present invention in any way.

EXAMPLE 1

Preparation of Zirconium Phosphate 34.4 g of 85% phosphoric acid was diluted with water to a volume of 540 ml (solution A).

41.6 g of concentrated nitric acid (d=1.38) was diluted with water to a volume of 556 ml, and 58.5 g of zirconium nitrate was dissolved therein (solution B).

Solution B was dropwise added to solution A with stirring.

The precipitate formed was aged and collected by filtration. The product was washed with water, dried and calcined at 400° C. in air for 3 hours to obtain amorphous zirconium phosphate.

The resulting zirconium phosphate had a chemical composition such that the Zr content was 36 wt % and the P content was 16 wt %.

Removal of $NO_x$

One gram of the zirconium phosphate catalyst prepared above was charged into a normal pressure flow type reaction apparatus. Helium gas (hereafter referred to as He) containing 2,000 ppm of nitrogen monoxide (hereafter referred to as NO), 10% of oxygen and 600 ppm of propylene was passed through the catalyst bed at a flow rate 60 ml/min to effect reaction (a space velocity of about 2,000 h$^{-1}$). The helium gas was used to ensure analyzing $N_2$ produced on reaction.

The gas obtained after the reaction was analyzed by means of a gas chromatograph. The catalytic reduction ratio of NO into nitrogen (percent conversion of NO to nitrogen) was determined from the yield of nitrogen produced by the reaction. The results are shown in Table 1. The formula used to calculate the catalytic reduction ratio is as below:

$$\frac{N_2 \text{ formed (in mole)} \times 2}{NO_x \text{ introduced into reactor (in mole)}} \times 100$$

EXAMPLES 2 AND 3

Preparation of Pd- or Cu-Substituted Zirconium Phosphate

A Cu-substituted zirconium phosphate was prepared in the following manner. Ten grams of zirconium phosphate was weighed and immersed overnight in 200 ml of an aqueous solution of copper amine complex salt while stirring to effect the substitution of Cu ion. The copper amine complex was prepared by using 4 g of cupric chloride.

The resulting substitute product was washed with water, dried and calcined at 500° C. in air for 3 hours.

A Pd-substituted zirconium phosphate was prepared in the same manner as in the preparation of the Cu-substituted zirconium phosphate except that one gram of a Pd amine complex salt (hydrochloride) was used in place of the copper amine complex salt.

The chemical composition of the resulting Cu-substituted zirconium phosphate was such that the contents of Zr, P and Cu were 29.0 wt %, 12.0 wt % and 9.2 wt %, respectively.

The chemical composition of the resulting Pd-substituted zirconium phosphate was such that the contents of Zr, P and Pd were 34.0 wt %, 15.0 wt % and 1.9 wt %, respectively.

Removal of $NO_x$

The catalytic reduction ratio of NO was determined in the same manner as in Example 1 by using each of the Cu-substituted and Pd-substituted zirconium phosphate catalysts prepared above.

The results are shown in Table 1.

EXAMPLE 4

The catalytic reduction ratio of NO was determined in the same manner as in Example 1 using the Cu-substituted zirconium phosphate catalyst prepared in Example 3 except that the amount of the catalyst charged was 0.3 g, and the mixed gas had a composition consisting of 1000 ppm of NO, 1000 ppm of propylene, 10% of oxygen, balance He, and the mixed gas was introduced at a flow rate of 180 ml/min into the reaction apparatus.

The results are shown in Table 1.

EXAMPLES 5 AND 6

Preparation of Fe- or Mn-Substituted Zirconium

The procedure of Example 2 was repeated except that 5 g of ferric nitrate or 5 g of manganous chloride was used in place of the copper amine complex salt to obtain an Fe-substituted zirconium phosphate or an Mn-substituted zirconium phosphate.

The chemical composition of the resulting Fe-substituted zirconium phosphate was such that the contents of Zr, P and Fe were 33.0 wt %, 14 wt % and 4.2 wt %, respectively.

The chemical composition of the resulting Mn-substituted zirconium phosphate was such that the contents of Zr, P and Mn were 35.0 wt %, 15.0 wt % and 0.74 wt %, respectively.

Removal of $NO_x$

The catalytic reduction ratio of NO was determined in the same manner as in Example 1 using each of the Fe-substituted and Mn-substituted zirconium phosphate catalysts prepared above except that the mixed gas had a composition consisting of 1000 ppm of NO, 1000 ppm of propylene, 10% of oxygen, balance He, was used.

The results are shown in Table 1.

EXAMPLE 7

Preparation of γ-Zirconium Phosphate

In 500 ml of water was dissolved 80.5 g zirconium chloride. While stirring the resulting solution, 230 g ammonium dihydrogenphosphate was added thereto in portions.

The resulting mixture in the form of a slurry was charged into an autoclave and reacted at 150° C. and reaction pressure for 36 hours. The product was recovered by filtration, washed with water and dried.

It was found that the product was mainly composed of γ-zirconium phosphate [$NH_4ZrH(PO_4)_2 \cdot 2H_2O$]. This product was calcined at 500° C. in air for 3 hours to obtain crystalline γ-zirconium phosphate.

Removal of $NO_x$

The catalytic reduction ratio of NO was determined in the same manner as in Example 1 using the thus-obtained crystalline γ-zirconium phosphate catalyst.

The results are shown in Table 2.

EXAMPLE 8

Preparation of Cerium Phosphate

A solution of 20 g of ceric sulfate dissolved in 200 g of water was dropwise added to a mixture of 20 g of 85% phosphoric acid and 200 g of water with stirring for 10 minutes.

The resulting precipitate was heated on a hot water bath at about 80° C. for 3 hours, recovered by filtration, washed with water, dried and calcined at 400° C. in air for 3 hours.

The chemical composition of the product was such that the content of Ce was 40 wt% and that of P was 18 wt %.

Removal of NO

The catalytic reduction ratio of NO was determined in the same manner as in Example 1 using the thus-prepared cerium phosphate catalyst.

The results are shown in Table 2.

EXAMPLE 9

Preparation of Vanadium Phosphate 32 g of 85% phosphoric acid was thoroughly mixed with 10 g of vanadium pentoxide. The mixture was left to stand for 3 days. The mixture was then washed with methyl alcohol to remove unreacted phosphoric acid. The product was dried and calcined in air at 500° C. for 3 hours.

The chemical composition of the product was such that the content of V was 20 wt % and that of P was 24 wt %.

Removal of $NO_x$

The catalytic reduction ratio of NO was determined in the same manner as in Example 1 using the thus-prepared vanadium phosphate catalyst.

The results are shown in Table 2.

EXAMPLE 10

The catalytic reduction ratio of NO was determined in the same manner as in Example 1 except that amorphous zirconium phosphate obtained in Example 1 was used as the catalyst, ethyl ether was used in place of propylene and He gas containing ethyl ether in an amount corresponding to 500 ppm (by weight) of propylene, 1,000 ppm of NO and 10% of oxygen was used.
The results are shown in Table 2.

COMPARATIVE EXAMPLE 1

In a small amount of water was dissolved 2 g of commercially available sodium phosphate ($Na_3PO_4$), and 8 g of commercially available silica gel was impregnated with the resulting solution. Water was evaporated, and the resulting product was dried and calcined at 400° C. in air for 3 hours to obtain a 20% $Na_3PO_4/SiO_2$ catalyst.

The catalytic reduction ratio of NO was determined in the same manner as in Example 5 using the thus-obtained catalyst.

The results are shown in Table 2.

EXAMPLES 11 TO 15

To zirconium phosphate prepared in the same manner as in Example 1, there were added about 20 wt % of kaolin and an appropriate amount of water. The mixture was vigorously kneaded and extruded into ⅛" pellets.

The pellets were dried and calcined at 400° C. in air for 3 hours to obtain a catalyst for testing.

Removal of $NO_x$

In Examples 11 and 13, 60 ml of the catalyst prepared above was charged into a normal pressure flow type reaction apparatus. A mixture of an exhaust gas discharged from a diesel engine and a predetermined amount of propylene at a flow rate of 4 l/min was passed through the catalyst bed kept at 400° C. to effect reaction.

In Example 15, gas oil was used in place of propylene as the reducing agent in the exhaust gas, and the mixed gas at a flow rate of 0.6 ml/hr was passed through the catalyst bed.

The amount of gas oil added corresponded to about 1000 ppm (by weight) of propylene.

In Examples 12 and 14, propylene was not mixed with the exhaust gas, and the reduction of $NO_x$ was carried out using the reducing substances such as hydrocarbons, particulates, etc., in the exhaust gas.

The exhaust gas and the gas obtained after the reaction were analyzed by means of a chemiluminescence $NO_x$ analyzer. The catalytic removal ratio of $NO_x$ was calculated from the analysis results The results are shown in Table 3.

The operating conditions of the diesel engine and the composition of the exhaust gas are shown in Table 4.

EXAMPLES 16 AND 17 AND REFERENTIAL EXAMPLE

One gram of zirconium phosphate (Mn-substituted product) obtained in Example 6 was charged as the catalyst for the reduction of NO into the first zone (upstream side) of a reactor, and one gram of a commercially available catalyst composed of 0.5% palladium supported on alumina was charged as the catalyst for the oxidation of unreacted hydrocarbon, etc., into the second zone (downstream side) of the reactor. In the same manner as in Example 6, the catalytic reduction ratio of NO was determined (Example 16).

The results are shown in Table 5.

TABLE 1

| | | | Reduction ratio of NO into $N_2$ (%) | | | |
|---|---|---|---|---|---|---|
| | | Hydro- | Reaction temp. (°C.) | | | |
| Example | Catalyst | carbon | 200 | 300 | 400 | 500 |
| 1 | zirconium phosphate | propylene | 26.8 | 33.2 | 46.6 | 30.6 |
| 2 | Pd-substituted zirconium phosphate | propylene | 23.1 | 12.3 | 1.7 | — |
| 3 | Cu-substituted zirconium phosphate | propylene | 49.3 | 13.8 | 4.9 | — |
| 4 | Cu-substituted zirconium phosphate | propylene | 3.1 | 37.5 | 20.4 | 8.0 |
| 5 | Fe-substituted zirconium phosphate | propylene | 33.2 | 56.4 | 35.8 | 12.5 |
| 6 | Mn-substituted zirconium phosphate | propylene | 20.0 | 37.1 | 54.9 | 40.3 |

TABLE 2

| | | | Reduction ratio of NO into $N_2$ (%) | | | |
|---|---|---|---|---|---|---|
| | | Hydro- | Reaction temp. (°C.) | | | |
| Example | Catalyst | carbon | 200 | 300 | 400 | 500 |
| 7 | γ-zirconium phosphate | propylene | 22.5 | 37.2 | 47.7 | 11.8 |
| 8 | cerium phosphate | propylene | 21.3 | 25.6 | 15.7 | 9.8 |
| 9 | vanadium phosphate | propylene | 14.3 | 21.8 | 29.7 | 15.2 |
| 10 | zirconium phosphate | ethyl ether | 38.6 | 62.4 | 40.9 | 22.3 |
| Comp. Ex. 1 | 20% $Na_3PO_4/SiO_2$ | propylene | 1.0 | 1.0 | 1.0 | 1.0 or below |

TABLE 3

| | | | Removal ratio of $NO_x$ (%) |
|---|---|---|---|
| Example | Catalyst | Hydrocarbon added | (Reaction temp.) 400° C. |
| 11 | zirconium phosphate | propylene | 85 |
| 12 | zirconium phosphate | omitted | 56 |
| 13 | zirconium phosphate | propylene | 72 |
| 14 | zirconium phosphate | omitted | 48 |
| 15 | zirconium phosphate | gas oil | 87 |

Amount of hydrocarbon added:
concentration of propylene:
210 ppm in Example 11
750 ppm in Example 13
Amount of gas oil added:
0.6 ml/hr in Example 15

TABLE 4

| | Example No. | |
|---|---|---|
| | 11, 12 | 13 to 15 |
| Operation conditions of engine | | |
| Number of revolutions (rpm) | 1350 | 1500 |
| Torque (kg · m) | 2.6 | 14.6 |
| Composition of Exhaust gas at the inlet of the catalyst bed | | |
| $NO_x$ (ppm) | 215 | 780 |
| CO (ppm) | 320 | 2800 |
| $CO_2$ (%) | 2.7 | 9.2 |
| $SO_x$ (%) | — | — |
| $O_2$ (%) | 16.1 | 9.3 |
| Total hydrocarbon (ppm) | 185 | 207 |
| Smoke concentration (%)(*) | — | 14 |
| Engine used: | | |
| Isuzu 4JB1, direct injection 4-cylindered engine | | |
| total displacement: | | |
| 2771 cc | | |
| 88 ps/3600 rpm | | |

TABLE 4-continued

| | Example No. | |
|---|---|---|
| | 11, 12 | 13 to 15 |
| Gas oil (fuel): sulfur content: 0.47% | | |

(*): "Smoke concentration" means an exhaust gas concentration which was measured according to JIS-D-1101.

TABLE 5

| Example | Reaction temperature (°C.) | Reduction ratio of NO into $N_2$ (%) | Composition of exhaust gas (ppm) | | |
|---|---|---|---|---|---|
| | | | CO | $CO_2$ | propylene |
| 16 | 200 | 18.2 | 0 | 3150 | 0 |
| | 300 | 37.9 | 0 | 3200 | 0 |
| 17 | 200 | 19.7 | 0 | 3180 | 0 |
| | 300 | 38.1 | 0 | 3210 | 0 |
| Referential Example | 200 | 19.5 | 0 | 1081 | 790 |
| | 300 | 38.3 | 87 | 1730 | 520 |

EXAMPLES 18 TO 27

Preparation of Catalyst Composed of 15% Metal Sulfate Supported on Silica Gel 1.5 g (in terms of anhydrous salt) of each of zirconium sulfate (Example 18), ferric sulfate (Example 19), aluminum sulfate (Example 20), nickel sulfate (Example 21), cobalt sulfate (Example 22), copper sulfate (Example 23), magnesium sulfate (Example 24), vanadium sulfate (Example 25), chromium sulfate (Example 26) and manganese sulfate (Example 27) was dissolved in a small amount of water, and 8.5 g of silica gel (xerogel) was impregnated with each solution.

Water was evaporated, and the resulting impregnated material was dried and calcined at 400° C. in air for 3 hours to obtain a sulfate catalyst. Silica gel and the metal sulfates were used as marketed.

Removal of $NO_x$

One gram of each of the metal sulfate catalysts prepared above was charged into a normal pressure flow type reaction apparatus. Helium gas (hereinafter referred to as He) containing 1000 ppm of nitrogen monoxide (hereinafter referred to as NO), 10% of oxygen and 300 ppm of propylene at a flow rate of 60 ml/min was passed through the catalyst bed to effect reaction.

The gas obtained after the reaction was analyzed by means of a gas chromatograph. The catalytic reduction ratio of NO was determined from the yield of nitrogen produced by the reaction. The results are shown in Table 6.

EXAMPLE 28

The catalytic reduction ratio of NO was determined in the same manner as in Example 18 using one gram of the 15% nickel sulfate/silica gel catalyst except that methyl alcohol in an amount corresponding to 600 ppm (by weight) of propylene was used as the reducing agent in He gas, that is, He gas containing 1000 ppm of NO, methyl alcohol in an amount as defined above, and 10% of oxygen was used as the mixed gas. The catalytic reduction ratio of NO was determined in the same manner as in Example 18.

The results are shown in Table 6.

EXAMPLE 29

A nickel sulfate catalyst was prepared in the same manner as in Example 21 except that 5.0 g (in terms of anhydrous salt) of nickel sulfate and 5.0 g of silica gel were used.

The catalytic reduction ratio of NO was determined in the same manner as in Example 18. The results are shown in Table 6.

EXAMPLE 30

The catalytic reduction ratio of NO was determined in the same manner as in Example 18 using a nickel sulfate catalyst which was calcined at 400° C. in air for 2 hours.

The results are shown in Table 6.

EXAMPLE 31

The catalytic reduction ratio of NO was determined in the same manner as in Example 18 except that the catalyst obtained in Example 29 was used, the amount of the catalyst charged was 0.1 g, and the mixed gas contained 1000 ppm of propylene.

The results are shown in Table 6.

EXAMPLE 32

The catalytic reduction ratio of NO was determined in the same manner as in Example 18 using a catalyst which was prepared in the same manner as in Example 21 except that kaolin (commercially available product) was used in place of the silica gel.

The results are shown in Table 6.

EXAMPLE 33

The catalytic reduction ratio of NO was determined in the same manner as in Example 18 using a catalyst which was prepared in the same manner as in Example 21 except that 0.1 g (in terms of anhydrous salt) of nickel sulfate was used and 9.9 g of γ-alumina (commercially available product) was used.

The results are shown in Table 6.

COMPARATIVE EXAMPLES 2 TO 4

A 15% sodium sulfate/silica gel catalyst (Comparative Example 2) was prepared in the same manner as in Example 18 using sodium sulfate as the metal sulfate.

The silica gel of Comparative Example 3 was the carrier used in Example 18, and the kaolin of Comparative Example 4 was the carrier use in Example 32. No metal was supported thereon.

The catalytic reduction ratio of NO was determined in the same manner as in Example 18 using each of these catalysts.

The results are shown in Table 7.

It can be seen from Table 7 that sodium sulfate, which is an alkali metal (monovalent metal) sulfate, silica gel and kaolin do not show any significant activity for the catalytic reduction.

EXAMPLE 34 AND 35 AND REFERENTIAL EXAMPLE

One gram of the 15% cobalt sulfate/silica gel catalyst obtained in Example 22 was charged as the catalyst for the reduction of NO into the first zone (upstream side) of a reactor, and one gram of a commercially available catalyst composed of 0.5% palladium supported on alumina was charged as the catalyst for the oxidation of unreacted hydrocarbon, etc., into the second zone (downstream side) of the reactor. In the same manner as in Example 22, the catalytic reduction ratio of NO was determined (Example 34). The results are shown in Table 8.

The catalytic reduction ratio of NO was determined in the same manner as described above using one gram of a catalyst composed of 30% ferric oxide supported on alumina as the oxidation catalyst (Example 35). The results are also shown in Table 8.

The oxidation catalyst composed of ferric oxide supported on alumina used in Example 35 was prepared in the following manner. In 300 ml of distilled water there was dissolved 38 g of ferric nitrate ($Fe(NO_3)_3 \cdot 9H_2O$). To the resulting solution there was added 35 g of commercially available γ-alumina with stirring, and 14% aqueous ammonia was dropwise added thereto until the pH reached 8 to thereby deposit iron hydroxide on the alumina. The product was recovered by filtration, washed with water, dried and calcined at 500° C. in air for 3 hours to obtain the catalyst.

For reference, the catalytic reduction ratio of NO was determined in the same manner as in Examples 34 and 35 by omitting the oxidation catalysts of Examples 34 and 35.

The results are shown in Table 8.

It can be seen from Table 8 that unreacted propylene and carbon monoxide (which is an incomplete combustion product) were discharged in the Referential Example in which the oxidation catalyst was omitted, while only carbon dioxide gas (which is a complete oxide) was discharged in Examples 34 and 35 in which the oxidation catalysts were charged.

TABLE 6

| Example No. | Metal sulfate catalyst | Reduction ratio of NO into $N_2$ (%) reaction temp. (°C.) | | | |
|---|---|---|---|---|---|
| | | 200 | 300 | 400 | 500 |
| 18 | 15% zirconium sulfate/silica | 11.9 | 12.0 | 18.3 | 19.4 |
| 19 | 15% ferric sulfate/silica | 6.5 | 19.4 | 6.6 | 4.4 |
| 20 | 15% aluminum sulfate/silica | 13.8 | 6.7 | 6.7 | 15.4 |
| 21 | 15% nickel sulfate/silica | 17.9 | 7.3 | 15.9 | 37.1 |
| 22 | 15% cobalt sulfate/silica | 20.3 | 16.1 | 25.7 | 30.1 |
| 23 | 15% copper sulfate/silica | 12.6 | 12.6 | 8.0 | 0 |
| 24 | 15% magnesium sulfate/silica | 15.4 | 15.1 | 9.6 | 4.2 |
| 25 | 15% vanadium sulfate/silica | 5.5 | 19.5 | 22.3 | 8.5 |
| 26 | 15% chromium sulfate/silica | 7.8 | 21.9 | 28.7 | 25.6 |
| 27 | 15% manganese sulfate/silica | 24.4 | 16.5 | 7.5 | 3.8 |
| 28 | 15% nickel sulfate/silica | 11.7 | 18.9 | 56.4 | 51.2 |
| 29 | 50% nickel sulfate/silica | 14.3 | 13.1 | 77.3 | 64.3 |
| 30 | nickel sulfate | 11.8 | 15.6 | 54.3 | 48.9 |
| 31 | 50% nickel sulfate/silica | 8.1 | 8.6 | 26.9 | 56.6 |
| 32 | 15% nickel sulfate/kaolin | 6.1 | 9.2 | 16.0 | 30.4 |
| 33 | 15% nikel sulfate/γ-alumina | 14.9 | 18.8 | 38.5 | 75.6 |

TABLE 7

| Ex. No. | Comp. Catalyst | Reduction ratio of NO into $N_2$ (%) reaction temp.(°C.) | | | |
|---|---|---|---|---|---|
| | | 200 | 300 | 400 | 500 |
| 2 | 15% sodium sulfate/silica | 1.0 or below | 1.0 or below | 1.0 or below | 1.0 or below |
| 3 | silica gel | " | " | " | " |
| 4 | kaolin | " | " | " | " |

TABLE 8

| Example | Reaction temperature (°C.) | Reduction ratio of NO into $N_2$ (%) | Composition of exhaust gas (ppm) | | |
|---|---|---|---|---|---|
| | | | CO | $CO_2$ | propylene |
| 34 | 300 | 18.8 | 0 | 980 | 0 |
| | 400 | 27.5 | 0 | 950 | 0 |
| 35 | 300 | 17.9 | 0 | 985 | 0 |
| | 400 | 27.7 | 0 | 965 | 0 |
| Referential Example | 300 | 17.7 | 0 | 340 | 200 |
| | 400 | 28.1 | 95 | 355 | 90 |

EXAMPLE 36

Synthesis of Cobalt Aluminate Catalyst

In 300 ml of pure water were dissolved 29 g of cobalt nitrate hexahydrate and 75 g of aluminum nitrate nonahydrate. A solution of 38.4 g of ammonium carbonate dissolved in 100 ml of pure water was gradually added thereto with stirring to form a gel-form precipitate. The precipitate was washed with pure water three times, dried at 100° C. overnight and calcined at 600° C. in an air stream. The calcined material was then calcined at 800° C. in a muffle furnace for 3 hours to a cobalt aluminate catalyst having a blue color.

Removal of $NO_x$

One gram of the thus-obtained cobalt aluminate catalyst was charged into a normal pressure flow type reaction apparatus. He containing 1000 ppm of NO, 10% of oxygen and 300 ppm of propylene at a flow rate of 60 ml/min were passed through the catalyst bed to effect reaction. The gas obtained after the reaction was analyzed by means of a gas chromatograph, and the catalytic reduction ratio of NO was determined from the yield of nitrogen produced by the reaction. The results are shown in Table 9.

TABLE 9

| Reaction temp. (°C.) | Reduction ratio of NO into $N_2$ (%) |
|---|---|
| 300 | 3.1 |
| 350 | 17.6 |
| 400 | 52.6 |
| 500 | 35.1 |
| 600 | 12.9 |

EXAMPLES 37 TO 43

Synthesis of Metal Aluminate Catalysts Supported on Alumina

Commercially available pelletized γ-alumina was impregnated with an aqueous solution of each of the transition metal salts of the 4th period of the Periodic Table. After the impregnated material was left to stand for one hour, water was evaporated using a rotary evaporator. The impregnated material was then calcined at a temperature given in Table 10 in an air stream for 3 hours to obtain a metal aluminate supported on alumina.

Removal of NO$_x$

The catalytic reduction ratio of NO was determined in the same manner as in Example 36 except that each of the metal aluminate catalysts prepared above was used. The results are shown in Table 10.

TABLE 10

| Example | Catalyst (starting metal salt) | Amount of metal supported (%) | Calcination temperature (hue of catalyst) (°C.) | Reaction temperature (°C.) | Reduction ratio of NO into N$_2$ (%) |
|---|---|---|---|---|---|
| 37 | cobalt aluminate (cobalt acetate) | 2 | 600 (blue) | 300 | 4.2 |
|  |  |  |  | 400 | 49.3 |
|  |  |  |  | 500 | 28.5 |
|  |  |  |  | 600 | 12.4 |
| 38 | cobalt aluminate (cobalt acetate) | 2 | 800 (clear blue) | 300 | 3.7 |
|  |  |  |  | 400 | 41.6 |
|  |  |  |  | 450 | 44.6 |
|  |  |  |  | 500 | 30.8 |
|  |  |  |  | 600 | 13.3 |
| 39 | cobalt aluminate (cobalt acetate) | 5 | 600 (blue) | 300 | 11.4 |
|  |  |  |  | 400 | 43.3 |
|  |  |  |  | 500 | 27.1 |
|  |  |  |  | 600 | 15.7 |
| 40 | iron aluminate (iron nitrate) | 2 | 600 (brown) | 300 | 19.3 |
|  |  |  |  | 400 | 34.5 |
|  |  |  |  | 500 | 17.1 |
|  |  |  |  | 600 | 9.3 |
| 41 | nickel aluminate (nickel acetate) | 2 | 600 (white green) | 300 | 4.5 |
|  |  |  |  | 400 | 31.4 |
|  |  |  |  | 500 | 39.6 |
|  |  |  |  | 600 | 18.8 |
| 42 | copper aluminate (copper nitrate) | 2 | 500 (green) | 300 | 14.4 |
|  |  |  |  | 400 | 23.0 |
|  |  |  |  | 500 | 10.8 |
| 43 | manganese aluminate (manganese acetate) | 2 | 600 (brown) | 300 | 12.5 |
|  |  |  |  | 350 | 15.3 |
|  |  |  |  | 400 | 12.9 |

It is clear from the above results that according to the present invention, the reduction of No$_x$ can be effected even in the presence of excess oxygen.

EXAMPLES 44 TO 47

Preparation of Metal Aluminate Catalysts Supported on Alumina

In the same manner as in Examples 37 to 43, an aqueous solution of each of the transition metal salts of the 4th period of the Periodic Table was used, and the impregnated material was calcined at 600° C. in an air stream for 3 hours to obtain a metal aluminate catalyst support on alumina.

Removal of No$_x$

One gram of each of the metal aluminate catalysts prepared above was charged into a normal pressure flow type reaction apparatus. He gas containing 1000 ppm of NO, 10% of oxygen and 1000 ppm of propylene was passed through the catalyst bed at a flow rate of 60 ml/min to effect reaction. The gas obtained after the reaction was analyzed by means of a gas chromatograph, and the catalytic reduction ratio of NO was determined from the yield of nitrogen produced by the reaction. The results are shown in Table 11.

TABLE 11

| Example | Catalyst (starting metal salt) | Amount of metal supported (%) | Hue of catalyst | Reaction temperature (°C.) | Reduction ratio of NO into N$_2$ (%) |
|---|---|---|---|---|---|
| 44 | cobalt aluminate (cobalt acetate) | 5 | blue | 200 | 9.6 |
|  |  |  |  | 300 | 19.7 |
|  |  |  |  | 400 | 31.9 |
|  |  |  |  | 500 | 56.4 |
| 45 | cobalt aluminate (cobalt acetate) | 1 | pale blue | 200 | 15.2 |
|  |  |  |  | 300 | 25.1 |
|  |  |  |  | 400 | 67.3 |
|  |  |  |  | 500 | 83.3 |
| 46 | nickel aluminate (nickel nitrate) | 10 | white green | 200 | 9.5 |
|  |  |  |  | 300 | 18.1 |
|  |  |  |  | 400 | 58.6 |
|  |  |  |  | 500 | 70.8 |
| 47 | nickel aluminate (nickel nitrate) | 5 | white green | 200 | 14.2 |
|  |  |  |  | 300 | 18.1 |
|  |  |  |  | 400 | 56.3 |
|  |  |  |  | 500 | 90.5 |

EXAMPLES 48 AND 49

Into a normal pressure flow type reaction apparatus was charged 0.1 g of each of the metal aluminates catalysts obtained in Examples 45 and 47. He gas containing 1000 ppm of NO, 10% of oxygen and 1000 ppm of propylene was passed through the catalyst bed at a reaction temperature of 500° C. while changing the gas flow rate. The gas obtained after the reaction was analyzed by means of a gas chromatograph, and the catalytic reduction ratio of NO was determined from the yield of nitrogen produced by the reaction. The results are shown in Table 12.

TABLE 12

| Example | Catalyst (starting metal salt) | Amount of metal supported (%) | Gas flow rate (ml/min) | Reduction ratio of NO into $N_2$ (%) |
|---|---|---|---|---|
| 48 | cobalt aluminate (cobalt acetate) | 1 | 150 | 71.3 |
|  |  |  | 240 | 69.6 |
|  |  |  | 300 | 66.8 |
| 49 | nickel aluminate (nickel nitrate) | 5 | 150 | 82.0 |
|  |  |  | 240 | 72.0 |
|  |  |  | 300 | 65.2 |

EXAMPLE 50

The catalytic reduction ratio of NO was determined in the same manner as in Example 47 except that He gas containing 1000 ppm of NO, 1000 ppm of methyl alcohol and 10% of oxygen was used as the mixed gas. The results are shown in Table 13.

TABLE 13

| Catalyst (starting metal salt) | Amount of metal supported (%) | Calcination temperature (hue of catalyst) (°C.) | Reaction temperature (°C.) | Reduction ratio of NO into $N_2$ (%) |
|---|---|---|---|---|
| Nickel aluminate (nickel nitrate) | 5 | 600 (white green) | 200 | 20.8 |
|  |  |  | 300 | 51.3 |
|  |  |  | 400 | 85.7 |
|  |  |  | 500 | 57.1 |

(Amount of catalyst charged: 0.1 g)

EXAMPLES 51 TO 55

A small amount of polyethylene glycol powder as a lubricant was added to 5% $Ni/Al_2O_3$ prepared in the same manner as in Example 47. The mixture was thoroughly mixed and tableted into ⅛" pellets. The pellets were calcined at 500° C. in air for 3 hours to obtain a catalyst for testing.

Removal of $NO_x$

In Examples 51 to 53, 12 ml of each of the catalysts prepared above was charged into a normal pressure flow type reaction apparatus. A mixture consisting of a predetermined amount of propylene and an exhaust gas discharged from a diesel engine at a flow rate of 4 l/min was passed through the catalyst bed kept at 500° C. to effect reaction. In Example 55, gas oil as the reducing agent was used in place of propylene, and the gas oil was added at a flow rate of 0.6 ml/hr to the exhaust gas at the inlet of the catalyst bed. Gas oil was used in an amount corresponding to about 1000 ppm (by weight) of propylene. In Examples 52 and 54, the exhaust gas as discharged was passed through the catalyst bed (namely, the removal reaction of $NO_x$ was conducted using reducing substances such as hydrocarbons, particulates, etc., in the exhaust gas without adding any reducing agent such as propylene to the exhaust gas). $NO_x$ in the exhaust gas and the product gas of the reaction were analyzed by means of a chemiluminescence $NO_x$ analyzer, and the catalytic reduction ratio of $NO_x$ was calculated from the analysis results. The results are shown in Table 14. The operating conditions of the diesel engine and the composition of the exhaust gas are shown in Table 15.

TABLE 14

| Example | Catalyst | Hydrocarbon added | Removal ratio of $NO_x$ (%) (reaction temperature) 400° C. |
|---|---|---|---|
| 51 | 5% $Ni/Al_2O_3$ | propylene | 85 |
| 52 | " | omitted | 43 |
| 53 | " | propylene | 79 |
| 54 | " | omitted | 41 |
| 55 | " | gas oil | 88 |

Amount of catalyst charged: 12 ml (⅛" pellets)
Gas flow rate: 4 l/min
Amount of hydrocarbon added:
concentration of propylene:
200 ppm in Example 51
750 ppm in Example 53
amount of gas oil: 0.6 ml/hr in Example 55

TABLE 15

|  | Example No. | |
|---|---|---|
|  | 51, 52 | 53 to 55 |
| Operating conditions of engine | | |
| Number of revolutions (rpm) | 1300 | 1500 |
| Torque (Kg · m) | 2.6 | 14.6 |
| Composition of exhaust gas at the inlet of the catalyst bed | | |
| $NO_x$ (ppm) | 203 | 750 |
| CO (ppm) | 311 | 3100 |
| $CO_2$ (%) | 2.6 | 9.6 |
| $SO_x$ (%) | — | — |
| $O_2$ (%) | 17.3 | 8.7 |
| Total hydrocarbon (ppm) | 188 | 195 |
| Smoke concentration (%) | — | 14 |

Engine used:
Isuzu 4JB1, direct injection, 4-cylindered engine
total displacement 2771 cc
88 ps/3600 rpm
Gas oil (fuel): sulfur content: 0.47%

EXAMPLES 56 AND REFERENTIAL EXAMPLE

One gram of 2% $Ni/Al_2O_3$ obtained in Example 41 was charged as the catalyst for the reduction of NO into the first zone (upstream side) of a reactor, and one gram of commercially available catalyst composed of 0.5% palladium supported on alumina was charged as the catalyst for the oxidation of unreacted hydrocarbon, etc., into the second zone (downstream side) of the reactor. The catalytic reduction ratio of NO was determined in the same manner as in Example 41 except that He gas containing 1000 ppm of NO, 330 ppm of propane and 10% of oxygen was used as the mixed gas, and the reaction temperature was 400° C. (Example 56). The results are shown in Table 16.

For reference, the catalytic reduction ratio of NO was determined in the same manner as in Example 56 except that the above oxidation catalyst was omitted (Referential Example). The results are shown in Table 16.

It is clear from Table 16 that unreacted propylene and carbon monoxide (which is an incomplete oxide) are discharged in the Referential Example in which the oxidation catalyst was omitted, while only carbon dioxide gas (which is a complete oxide) was discharged in Example 56 in which the oxidation catalyst was charged.

TABLE 16

| Example | Reaction temperature (°C.) | Reduction ratio of NO into $N_2$ (%) | Composition of exhaust gas (ppm) | | |
|---|---|---|---|---|---|
| | | | CO | $CO_2$ | propane |
| 21 | 400 | 31.9 | 0 | 1080 | 0 |
| Referential Example | 400 | 32.5 | 120 | 290 | 170 |

Catalyst: 2% Ni/$Al_2O_3$
Amount of catalyst charged: 1 g
Gas flow rate: 60 ml/min
Mixed gas:
NO; 1000 ppm,
propane; 330 ppm,
oxygen; 10%,
He; balance It can be seen from the Examples, Comparative Examples and Referential Examples given herein that the process according to the present invention enables the efficient catalytic reduction of $NO_x$ into nitrogen, even in the presence of excess oxygen, without resulting in a loss of catalyst activity due to the presence of sulfur oxides. Thus, the process according to the present invention is very effective in all the aspects as compared with those using conventional catalysts.

While the present invention has been described in detail and with reference to specific embodiments thereof, it is apparent to one skilled in the art that various changes and modifications can be made therein without departing from the spirit and the scope of the present invention.

What is claimed is:

1. A process for removing nitrogen oxides from an exhaust gas which comprises bringing the exhaust gas containing nitrogen oxides into contact with at least one catalyst selected from the group consisting of a polyvalent metal phosphate, a polyvalent metal sulfate and an aluminate of a transition metal of the 4th period of the Periodic Table in an oxidizing atmosphere containing excess oxygen and in the presence of a hydrocarbon or an oxygen-containing organic compound, wherein said nitrogen oxides are removed from said exhaust gas by contacting a gaseous mixture consisting essentially of said oxidizing atmosphere containing excess oxygen, said hydrocarbon or said oxygen-containing organic compound and said exhaust gas containing nitrogen oxides with said at least one catalyst.

2. The process as claimed in claim 1, wherein said exhaust gas containing nitrogen oxides is further brought into contact with an oxidation catalyst.

3. A process for removing nitrogen oxides from an exhaust gas which comprises bringing the exhaust gas containing nitrogen oxides into contact with a polyvalent metal phosphate catalyst in an oxidizing atmosphere containing excess oxygen and in the presence of a hydrocarbon or an oxygen containing organic compound, wherein said nitrogen oxides are removed from said exhaust gas by contacting a gaseous mixture consisting essentially of said oxidizing atmosphere containing excess oxygen, said hydrocarbon or said oxygen-containing organic compound and said exhaust gas containing nitrogen oxides with said polyvalent metal phosphate catalyst.

4. A process for removing nitrogen oxides from an exhaust gas which comprises bringing the exhaust gas containing nitrogen oxides into contact with a polyvalent metal sulphate catalyst in an oxidizing atmosphere containing excess oxygen and in the presence of a hydrocarbon or an oxygen containing organic compound, wherein said nitrogen oxides are removed from said exhaust gas by contacting a gaseous mixture consisting essentially of said oxidizing atmosphere containing excess oxygen, said hydrocarbon or said oxygen-containing organic compound and said exhaust gas containing nitrogen oxides with said polyvalent metal sulphate catalyst.

5. A process for removing nitrogen oxides from an exhaust gas which comprises bringing the exhaust gas containing nitrogen oxides into contact with a catalyst composed of an aluminate of a transition metal of the 4th period of the Periodic Table in an oxidizing atmosphere containing excess oxygen and in the presence of a hydrocarbon or an oxygen containing organic compound, wherein said nitrogen oxides are removed from said exhaust gas by contacting a gaseous mixture consisting essentially of said oxidizing atmosphere containing excess oxygen, said hydrocarbon or said oxygen-containing organic compound and said exhaust gas containing nitrogen oxides with said catalyst composed of an aluminate of a transition metal of the 4th period of the Periodic Table.

6. The process as claimed in claim 1, 2, or 3, wherein said polyvalent metal phosphate is tin phosphate, zirconium phosphate, titanium phosphate, vanadium phosphate, niobium phosphate or cerium phosphate.

7. The process as claimed in claim 1, 2 or 4, wherein said polyvalent metal sulfate is copper sulfate, magnesium sulfate, zinc sulfate, cadmium sulfate, barium sulfate, aluminum sulfate, zirconium sulfate, vanadium sulfate, chromium sulfate, manganese sulfate, iron sulfate, cobalt sulfate or nickel sulfate.

8. The process as claimed in claim 1, 2 or 5, wherein said catalyst composed of a transition metal of the 4th period of the Periodic Table is chromium aluminate, manganese aluminate, iron aluminate, cobalt aluminate, nickel aluminate, copper aluminate or zinc aluminate.

9. The process as claimed in claim 2, wherein said oxidation catalyst is composed of a noble metal, a base metal or a material having a perovskite crystal structure supported on a porous carrier.

10. The process as claimed in claim 9, wherein said noble metal is platinum, palladium, rhodium, ruthenium or iridium; said base metal is lanthanum, cerium, copper, iron or molybdenum; and said material having a perovskite crystal structure is cobalt lanthanum trioxide, iron lanthanum trioxide or cobalt strontium trioxide.

11. The process as claimed in claim 1, 2, 3, 4 or 5, wherein said hydrocarbon or said oxygen containing organic compound is used in an amount of 20 to 2000% in excess of the theoretical amount required for the reduction of $NO_x$.

12. The process as claimed in claim 11, wherein said hydrocarbon is a gaseous or liquid hydrocarbon.

13. The process as claimed in claim 12, wherein said gaseous hydrocarbon is methane, ethane, propane, butane, ethylene, propylene or butylene.

14. The process as claimed in claim 12, wherein said liquid hydrocarbon is gasoline, kerosene, gas oil or heavy oil.

15. The process as claimed in claim 11, wherein said oxygen containing organic compound is an alcohol, an ether, an ester or a ketone.

16. The process as claimed in claim 1, 2, 3, 4 or 5, wherein said nitrogen oxides are removed from the exhaust gas at a temperature in the range of from 100° to 800° C.

17. The process as claimed in claim 1, 2, 3, 4 or 5, wherein said at least one catalyst is in the form of a catalyst bed and the exhaust gas is introduced into the catalyst bed at a space velocity of from 500 to 100,000 $hr^{-1}$.

* * * * *